United States Patent
Kojima et al.

(10) Patent No.: US 12,391,402 B2
(45) Date of Patent: Aug. 19, 2025

(54) AIRCRAFT POSITION CONTROL SYSTEM, AIRCRAFT, AND AIRCRAFT POSITION CONTROL METHOD

(71) Applicant: MITSUBISHI HEAVY INDUSTRIES, LTD., Tokyo (JP)

(72) Inventors: Toru Kojima, Tokyo (JP); Satoshi Mori, Tokyo (JP); Katsumi Takagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/036,809

(22) PCT Filed: Jan. 13, 2022

(86) PCT No.: PCT/IB2022/050233
§ 371 (c)(1),
(2) Date: May 12, 2023

(87) PCT Pub. No.: WO2022/101895
PCT Pub. Date: May 19, 2022

(65) Prior Publication Data
US 2023/0406536 A1 Dec. 21, 2023

(30) Foreign Application Priority Data
Nov. 13, 2020 (JP) .................. 2020-189572

(51) Int. Cl.
*B64D 45/08* (2006.01)
*B64U 70/00* (2023.01)
*G05D 1/00* (2006.01)

(52) U.S. Cl.
CPC ............. *B64D 45/08* (2013.01); *B64U 70/00* (2023.01); *G05D 1/0684* (2013.01)

(58) Field of Classification Search
CPC ....... B64D 45/08; B64U 70/00; G05D 1/0684
See application file for complete search history.

(56) References Cited

U.S. PATENT DOCUMENTS

| | | | | |
|---|---|---|---|---|
| 4,148,029 A | * | 4/1979 | Quesinberry | G01S 13/68 342/107 |
| 11,435,761 B1 | * | 9/2022 | Wiegman | B64D 27/34 |

(Continued)

FOREIGN PATENT DOCUMENTS

JP 4-71998 3/1992

OTHER PUBLICATIONS

International Search Report issued Apr. 12, 2022 in International (PCT) Application No. PCT/IB2022/050233.

*Primary Examiner* — Gertrude Arthur Jeanglaude
(74) *Attorney, Agent, or Firm* — Wenderoth, Lind & Ponack, L.L.P.

(57) ABSTRACT

An aircraft position control system to make a position of an aircraft follow movement of a target landing point due to motion includes a motion quantity estimation processing unit that estimates a motion quantity of the target landing point, based on attitude correction acceleration for correcting attitude of the aircraft and a relative position between the aircraft and the target landing point, and a target information generation unit that outputs a target relative position between the aircraft and the target landing point to be achieved and target relative velocity between the aircraft and the target landing point to be achieved, based on the estimated motion quantity.

14 Claims, 7 Drawing Sheets

(56) References Cited

U.S. PATENT DOCUMENTS

| | | | | |
|---|---|---|---|---|
| 2003/0093187 A1* | 5/2003 | Walker | ............... | B64D 45/0059 |
| | | | | 701/1 |
| 2007/0021915 A1* | 1/2007 | Breed | ............. | B60W 30/18159 |
| | | | | 701/301 |
| 2009/0152391 A1* | 6/2009 | McWhirk | ................. | B64B 1/70 |
| | | | | 244/30 |

* cited by examiner

FIG.1
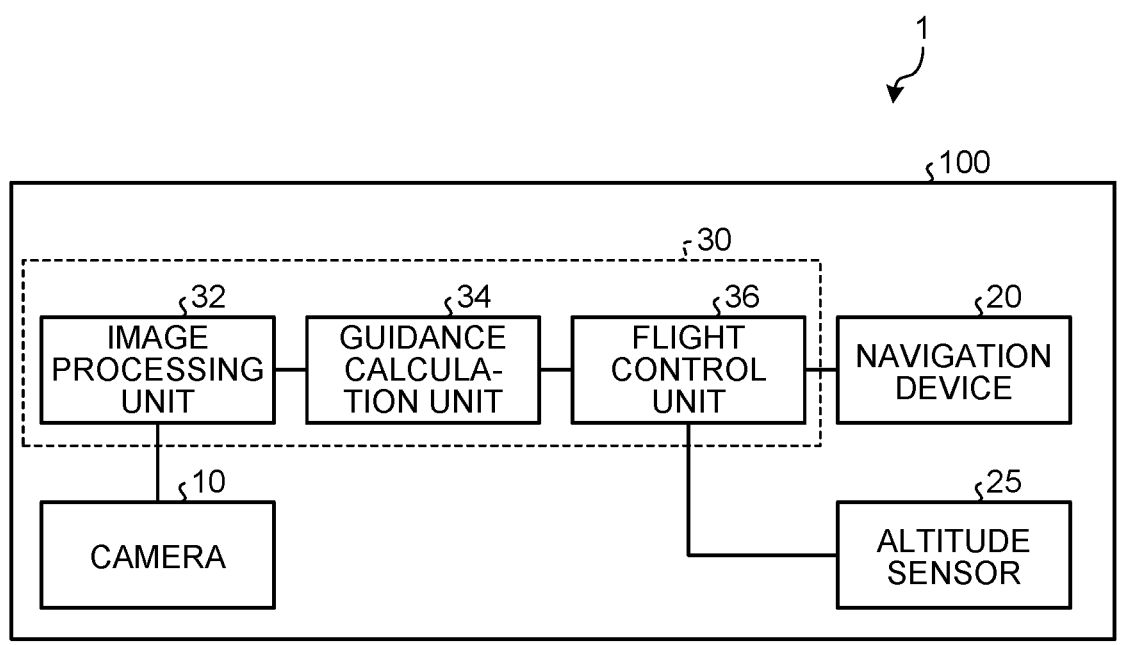
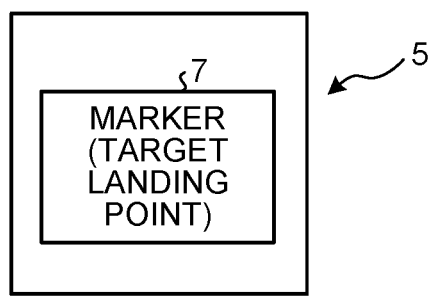

AIRCRAFT POSITION CONTROL SYSTEM, AIRCRAFT, AND AIRCRAFT POSITION CONTROL METHOD

FIELD

The present disclosure relates to an aircraft position control system, an aircraft, and an aircraft position control method, and particularly to position control for target point following hovering that makes a position of an aircraft follow the movement of a target landing point due to motion.

BACKGROUND

A conventional takeoff/landing control device to make an aircraft take off from and land on an aircraft carrier is known (see, for example, Patent Literature 1). The takeoff/landing control device according to Patent Literature 1 includes a ship motion prediction device that predicts a ship motion of an aircraft carrier, a takeoff/landing state instruction device that calculates the takeoff/landing state of an aircraft from/on the aircraft carrier upon the reception of the output of the ship motion prediction device, an instruction transmission device that transmits the output of the takeoff/landing state instruction device, an instruction reception device that receives the output of the instruction transmission device, and a flight motion control device that controls a flight motion upon the reception of the output of the instruction reception device. The ship motion prediction device, the takeoff/landing state instruction device, and the instruction transmission device are provided in the aircraft carrier and the instruction reception device and the flight motion control device are provided in the aircraft.

CITATION LIST

Patent Literature

Patent Literature 1: Japanese Patent Application Laid-open No. H04-71998

SUMMARY

Technical Problem

While Patent Literature 1 discloses the technique for the landing of a fixed wing aircraft, a rotorcraft lands on a deck as follows.

When a rotorcraft lands on a deck under a condition of large motion, the rotorcraft does not follow the movement of the deck due to the motion and hovers at a predetermined position, and performs the landing at a time when the motion has decreased. In this case, for example, the rotorcraft can land about once every 5 minutes for about 10 seconds. It has been necessary to aim for such a short time for the rotorcraft to land. If the rotorcraft fails to land, the rotorcraft needs to wait for the next timing when the motion decreases. Thus, it has been difficult for the rotorcraft to repeatedly land and take off at any given time, which is an operational limitation.

In view of this, it is an object of the present disclosure to provide an aircraft position control system, an aircraft, and an aircraft position control method that can make an aircraft suitably follow a target landing point even when the target landing point moves.

Solution to Problem

An aircraft position control system according to the present disclosure makes a position of an aircraft follow movement of a target landing point due to motion. The aircraft position control system includes: a motion quantity estimation processing unit that estimates a motion quantity of the target landing point, based on attitude correction acceleration obtained by correcting acceleration of the aircraft and based on a relative position between the aircraft and the target landing point; and a target information generation unit that outputs a target relative position between the aircraft and the target landing point to be achieved and target relative velocity between the aircraft and the target landing point to be achieved, based on the estimated motion quantity.

An aircraft according to the present disclosure includes: an acceleration correction processing unit that acquires attitude correction acceleration obtained by correcting acceleration of the aircraft; a relative position acquisition unit that acquires a relative position between the aircraft and a target landing point; and the above-described aircraft position control system.

An aircraft position control method according to the present disclosure is for making a position of an aircraft follow movement of a target landing point due to motion. The aircraft position control method includes the steps of: estimating a motion quantity of the target landing point, based on attitude correction acceleration obtained by correcting acceleration of the aircraft and a relative position between the aircraft and the target landing point; and outputting a target relative position between the aircraft and the target landing point to be achieved and target relative velocity between the aircraft and the target landing point to be achieved, based on the estimated motion quantity.

Advantageous Effects of Invention

According to the present disclosure, even when the target landing point moves, the aircraft can suitably follow the movement of the target landing point due to the motion.

BRIEF DESCRIPTION OF DRAWINGS

FIG. 1 is a schematic structure diagram illustrating one example of a position control system of an aircraft according to the present embodiment.

DESCRIPTION OF EMBODIMENTS

An embodiment of the present disclosure will hereinafter be described based on the drawings. This invention is not limited by the embodiment. In addition, the components in the following embodiment include those that can be replaced and easily conceived by those skilled in the art, or those that are substantially the same. Furthermore, the components described below can be combined as appropriate, and if there is more than one embodiment, the embodiments can be combined.

Embodiment

Figure 2:
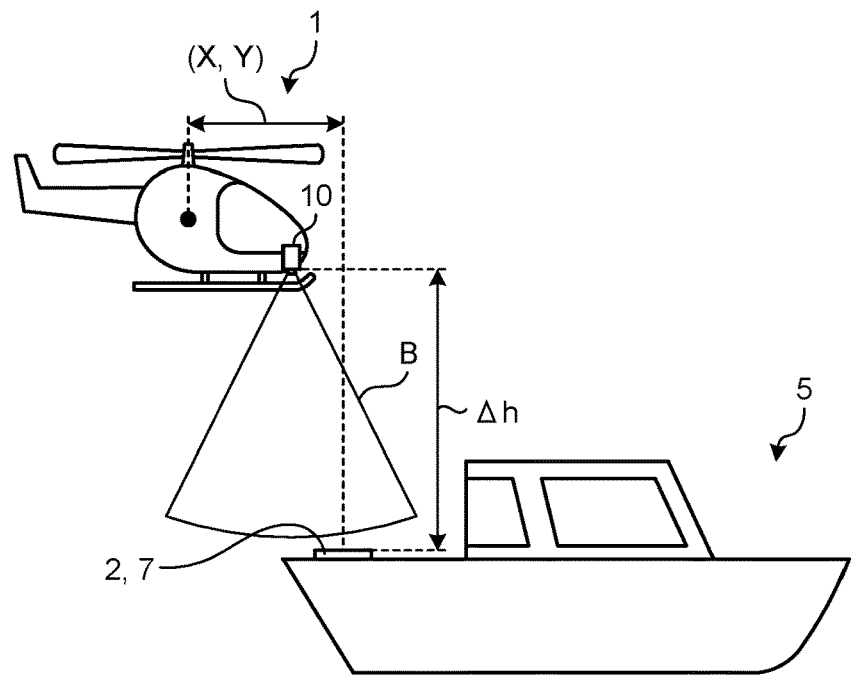
FIG. 2 is an explanatory diagram illustrating a state in which the aircraft according to the present embodiment heads to a target landing point.

FIG. 1 is a schematic structure diagram illustrating one example of a position control system of an aircraft according to the present embodiment, and FIG. 2 is an explanatory diagram illustrating a state in which the aircraft according to the present embodiment heads to a target landing point.

As illustrated in FIG. 1, an aircraft 1 is a flight vehicle as a rotorcraft (for example, helicopter, drone, etc.). In this embodiment, the aircraft 1 is an unmanned vehicle. The aircraft 1 may be any flight vehicle that can move forward, backward, sideways, swirl, and hover, and may be a manned vehicle. The aircraft 1 includes a position control system 100, and its flight is controlled by the position control system 100 so that the aircraft 1 lands at a target landing point 2 illustrated in FIG. 2.

Target Landing Point

In this embodiment, the target landing point 2 is provided on a vessel 5 as illustrated in FIG. 2. Therefore, the aircraft 1 lands on (lands on a deck of) the vessel 5 as a moving vehicle moving on the water. The vessel 5 includes a restraint device to restrain the aircraft 1 when the aircraft 1 lands at the target landing point 2, which is not illustrated in the drawing. However, the target landing point 2 is not limited to the vessel 5, and may alternatively be provided on a vehicle or the like as a moving object moving on the ground, or on non-moving equipment or on the ground.

Figure 3:
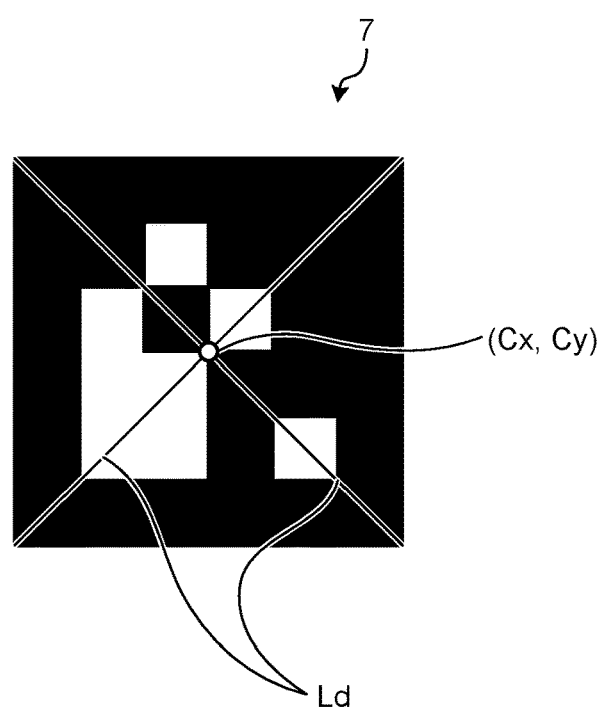
FIG. 3 is an explanatory diagram illustrating one example of a marker provided at the target landing point.

The target landing point 2 includes a marker 7 for the aircraft 1 to capture the position of the target landing point 2. FIG. 3 is an explanatory diagram illustrating one example of the marker provided at the target landing point. As illustrated in the drawing, the marker 7 is a square-shaped AR marker with two colors, black and white, for example. The marker 7 is not limited to the AR marker and may alternatively be any marker that can capture the position of the target landing point 2 by image processing, such as an H mark or an R mark indicating the landing point of a heliport. As the marker 7, a plurality of markers with different shapes may be provided on the vessel 5, and the aircraft 1 may be guided to the target landing point 2 corresponding to any of the different markers 7. In this embodiment, the marker 7 is provided on the vessel 5 to capture the position of the target landing point 2, but the configuration is not limited in particular as long as the position of the target landing point 2 can be acquired.

Position Control System

The position control system 100 for the aircraft according to this embodiment is a system for controlling the position of the aircraft 1 so that the aircraft 1 in flight lands at the target landing point 2. The position control system 100 is mounted on the aircraft 1. The position control system 100 includes a camera 10, a navigation device 20, and a control unit 30 as illustrated in FIG. 1.

The camera 10 is a photographing device mounted on the aircraft 1 via a gimbal that is not illustrated. The camera 10 may be a monocular camera, a compound-eye camera, an infrared camera, or the like, as long as the marker 7 can be photographed. The camera 10 is provided to photograph the marker 7 at the target landing point 2 from the aircraft 1. The camera 10 is able to adjust a photographing direction via the gimbal that is not illustrated. In this embodiment, the camera 10 is controlled by the control unit 30 so that its photographing range B (see FIG. 2) faces right downward in the vertical direction as one example. The camera 10 may be controlled by the control unit 30 so that the photographing range B faces forward at an angle to the vertical direction. The camera 10 may omit the gimbal and be fixed right under the body of the aircraft 1 so that the photographing direction faces downward in the vertical direction.

The navigation device 20 is, for example, an inertial navigation system (INS). In this embodiment, the navigation device 20 will be described in application to an inertial navigation system; however, any navigation device 20 may be used without particular limitations. The navigation device 20 may alternatively be an inertial navigation device that includes a global positioning system (GPS) to improve the accuracy of position measurement. In this embodiment, the application to the inertial navigation device including the GPS is described; however, it is not limited to the GPS and any position measurement unit that can measure the position with high accuracy may be used. For example, a quasi-zenith satellite system may be used. If the position can be measured with high accuracy only with the navigation device 20, the GPS or other position measurement unit may be omitted.

The navigation device 20 including the GPS acquires, for example, attitude angles of the aircraft 1 in a roll direction, a yaw direction, and a pitch direction, and aircraft velocity, inertial velocity, aircraft acceleration, a nose azimuth, and position coordinates in the earth coordinate system of the aircraft 1. The navigation device 20 may have an attitude angle sensor to detect the attitude angle of the aircraft 1, a velocity sensor to detect the aircraft velocity of the aircraft 1, an acceleration sensor to detect the aircraft acceleration of the aircraft 1, and a sensor to detect the nose azimuth of the aircraft 1. The navigation device 20 outputs the acquired attitude angle, aircraft velocity, inertial velocity, aircraft acceleration, nose azimuth, and position coordinates of the aircraft 1 to the control unit 30. Thus, the navigation device 20 functions as an acceleration acquisition unit to acquire the acceleration of the aircraft 1, an attitude acquisition unit to acquire the attitude of the aircraft 1, and an inertial velocity acquisition unit to acquire the inertial velocity of the aircraft 1.

The position control system 100 also includes an altitude sensor 25 that detects the altitude of the aircraft 1 from the ground or a water surface as illustrated in FIG. 1. The altitude sensor 25 is, for example, a laser altimeter, which measures relative altitude $\Delta h$ (see FIG. 2) from the aircraft 1 to the target landing point 2. The altitude sensor 25 may be either a radio altimeter or a barometric altimeter. These altimeters may be used in combination as appropriate in accordance with the environment in which they are used, i.e., to measure the altitude from the ground surface and the altitude from the sea level. The altitude sensor 25 outputs the detected relative altitude $\Delta h$ of the aircraft 1 to the control unit 30. The altitude sensor 25 may measure the altitude of the aircraft 1 and output the measured altitude to the control unit 30. The control unit 30 may cause a guidance calculation unit 34 described below to calculate the relative altitude $\Delta h$ to the target landing point 2, based on the altitude of the aircraft 1. The position control system 100 may cause, instead of the altitude sensor 25, an image processing unit 32, which is described below, to calculate the relative altitude Δh between the aircraft 1 and the vessel 5 by applying image processing to an image including the marker 7 photographed by the camera 10.

Control Unit

The control unit 30 includes the image processing unit 32, the guidance calculation unit 34, and a flight control unit 36. The control unit 30 includes a photographing control unit, which is not illustrated, that controls the photographing direction of the camera 10 via a gimbal, which is not illustrated, that is installed in the aircraft 1. In this embodiment, the camera 10 is adjusted so that the photographing range B of the camera 10 faces right downward in the vertical direction as described above.

Image Processing Unit

The image processing unit 32 applies image processing to an image photographed by the camera 10 to calculate a center (Cx, Cy) (see FIG. 3) of the marker 7, that is, the target landing point 2. The center (Cx, Cy) here is a point of coordinates in a camera fixed coordinate system whose origin is the center of the image photographed by the camera 10, and can be calculated based on the number of pixels from the center of the image. Specifically, as illustrated in FIG. 3, the image processing unit 32 specifies two diagonal lines Ld that extend between the corners of the marker 7 by image processing, and sets the intersection of the two specified diagonal lines Ld as the center (Cx, Cy) of the marker 7. The target landing point 2 is not limited to the center of the marker 7 (Cx, Cy), and may be any of the four corners of the marker 7 or offset from the center of the marker 7. The image processing unit 32 outputs the calculated center (Cx, Cy) of the marker 7 to the guidance calculation unit 34.

The image processing unit 32 may also calculate a bow azimuth of the vessel 5 by applying image processing to the image including the marker 7 photographed by the camera 10 to specify the direction of the marker 7 and mapping the direction to the nose azimuth of the aircraft 1, which is acquired by the navigation device 20. The image processing unit 32 may calculate the relative altitude Δh between the aircraft 1 and the vessel 5 by applying image processing to the image including the marker 7 photographed by the camera 10 as described above.

Guidance Calculation Unit

The guidance calculation unit 34 calculates the control quantity of the aircraft 1 to guide the aircraft 1 to the target landing point 2. The control quantity is the control quantity for adjusting the aircraft velocity, the attitude angle, the rate of change of the attitude angle, etc. of the aircraft 1. The guidance calculation unit 34 calculates a relative coordinate position between the aircraft 1 and the target landing point 2 in order to calculate the control quantity. Specifically, the guidance calculation unit 34 calculates the relative position (X, Y) between the aircraft 1 and the target landing point 2 as the relative coordinate position, and the relative altitude Δh between the aircraft 1 and the target landing point 2. The guidance calculation unit 34 also calculates the relative velocity between the aircraft 1 and the target landing point 2, and the like. The relative position (X, Y) is the distance between the aircraft 1 and the target landing point 2 in the horizontal direction. The relative altitude Δh is the distance between the aircraft 1 and the target landing point 2 in the vertical direction.

The guidance calculation unit 34 calculates the relative position (X, Y) between the aircraft 1 and the target landing point 2, based on the center (Cx, Cy) of the marker 7 calculated by the image processing unit 32, the azimuth of the camera 10, i.e., the nose azimuth of the aircraft 1, and the altitude of the aircraft 1 (relative altitude Δh to the target landing point 2). In this embodiment, the azimuth of the camera 10 is aligned with the nose azimuth of the aircraft 1, but the embodiment is not limited to this example and the azimuth of the camera 10 does not have to be aligned with the nose azimuth of the aircraft 1. Thus, the image processing unit 32 and the guidance calculation unit 34 acquire the relative position between the aircraft 1 and the target landing point 2.

The guidance calculation unit 34 calculates the relative altitude ah to the target landing point 2, based on the altitude of the aircraft 1 detected by the altitude sensor 25. Therefore, the altitude sensor 25 and the guidance calculation unit 34 acquire the relative altitude Δh between the aircraft 1 and the target landing point 2. The image processing unit 32 may calculate the relative altitude Δh between the aircraft 1 and the vessel 5 by applying image processing to the image including the marker 7 photographed by the camera 10.

The guidance calculation unit 34 also calculates the relative velocity between the aircraft 1 and the target landing point 2. Therefore, the guidance calculation unit 34 acquires the relative velocity between the aircraft 1 and the target landing point 2. More specifically, the guidance calculation unit 34 executes a relative velocity estimation process of calculating relative velocity (ΔVx, ΔVy) between the aircraft 1 and the target landing point 2 on the basis of the relative position (X, Y) and the aircraft velocity (Vx, Vy). Therefore, the guidance calculation unit 34 acquires the relative velocity (ΔVx, ΔVy) between the aircraft 1 and the target landing point 2.

The guidance calculation unit 34 then calculates the control quantity by feedback control (for example, PID control), based on the relative position (X, Y), the relative altitude ah, the relative velocity (ΔVx, ΔVy), and the aircraft acceleration. The feedback control is not limited to PID control, and may be P control, PI control, PD control, or the like. The guidance calculation unit 34 outputs a calculated control quantity C' (see FIG. 4) to the flight control unit 36.

Flight Control Unit

The flight control unit 36 controls each component of the aircraft 1 to fly the aircraft 1 according to the control quantity calculated by the guidance calculation unit 34. The flight control unit 36 controls the blade pitch angle, rotation velocity, etc. of each rotor blade according to the control quantity, so as to adjust the aircraft velocity, attitude angle, attitude rate, etc. of the aircraft 1. The aircraft 1 is thereby guided to the target landing point 2. Although the image processing unit 32 and the guidance calculation unit 34 are described in this embodiment as functional units separate from the flight control unit 36, the flight control unit 36, the image processing unit 32, and the guidance calculation unit 34 may be an integral functional unit. In other words, the process in the image processing unit 32 and the guidance calculation unit 34 may be performed in the flight control unit 36.

Aircraft Position Control

Figure 4:
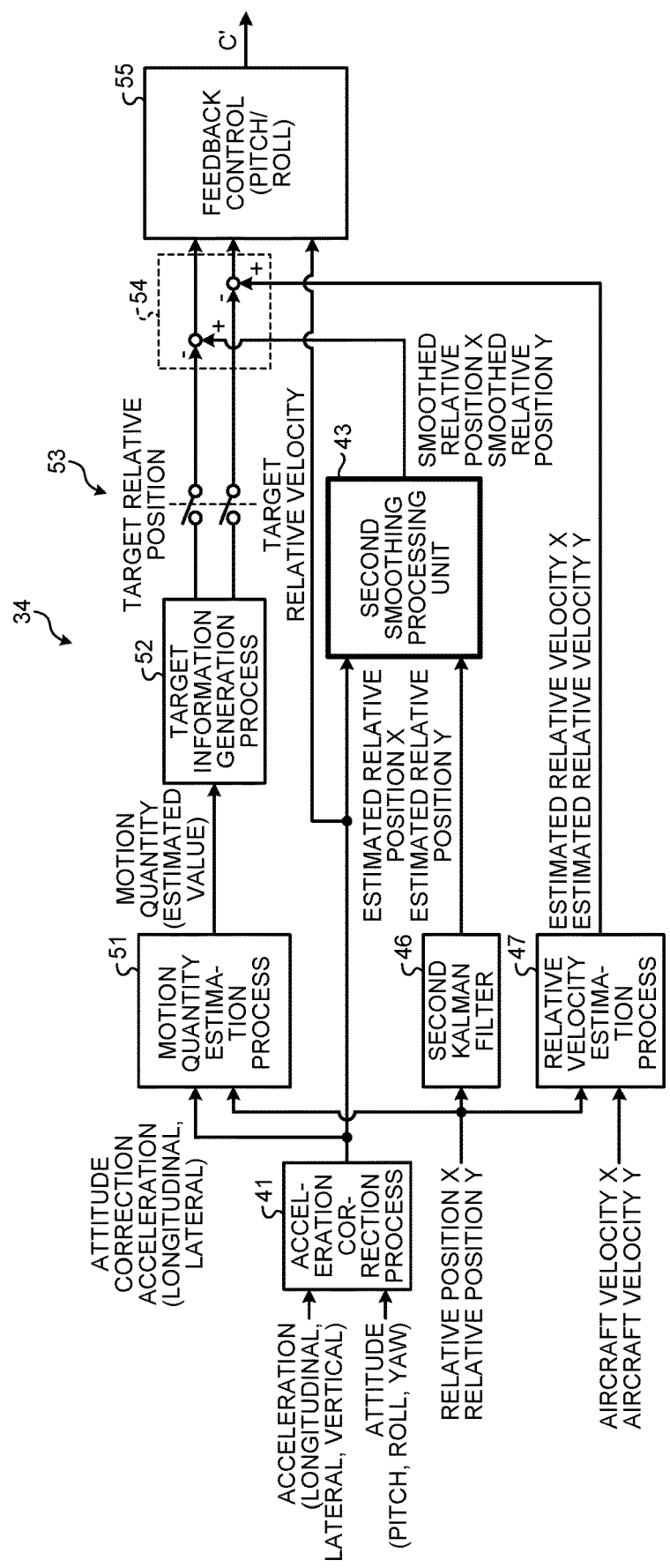
FIG. 4 is a block diagram illustrating one example of the position control to make the aircraft follow the target landing point that moves.

Next, the position control of the aircraft 1 according to this embodiment is described with reference to FIG. 4. FIG. 4 is a block diagram illustrating one example of the position control to make the aircraft follow the target landing point that moves. In the position control for the aircraft 1, the guidance calculation unit 34 performs the position control about the target point following hovering that makes the position of the aircraft 1 follow the movement of the target landing point 2 due to the motion with reference to the block diagram in FIG. 4. For this reason, the guidance calculation unit 34 calculates the control quantity C' for the aircraft 1 to execute the target point following hovering. In FIG. 4, the component in the X direction, which is the direction of the pitch axis, and the component in the Y direction, which is the direction of the roll axis, are expressed together, and the control quantity for each component is calculated by the guidance calculation unit 34.

Target Point Following Hovering about Relative Position

In FIG. 4, the position control about the target point following hovering is executed so that the aircraft 1 follows the target landing point 2 that changes due to the motion. The guidance calculation unit 34 includes an acceleration correction processing unit 41, a second smoothing processing unit 43, a second Kalman filter 46, a relative velocity estimation processing unit 47, a motion quantity estimation processing unit 51, a target information generation processing unit (target information generation unit) 52, a switch (switching unit) 53, a second subtraction circuit unit 54, and a feedback control unit 55. The acceleration correction processing unit 41, the second smoothing processing unit 43, the second Kalman filter 46, the relative velocity estimation processing unit 47, the motion quantity estimation processing unit 51, the target information generation processing unit 52, the switch 53, the second subtraction circuit unit 54, and the feedback control unit 55 may be achieved by the guidance calculation unit 34, by a processing unit separate from the guidance calculation unit 34, or by a combination thereof, without particular limitations.

The acceleration correction processing unit 41 outputs attitude correction acceleration in which the acceleration of the aircraft 1 is corrected, based on the acceleration of the aircraft 1 and the attitude of the aircraft 1. The attitude correction acceleration is the acceleration in an aircraft axis coordinate system converted to acceleration in an inertial space coordinate system by a coordinate conversion on the basis of the attitude angle of the aircraft 1. Specifically, to the acceleration correction processing unit 41, the acceleration of the aircraft 1 acquired in the navigation device 20 is input, and the attitude angle of the aircraft 1 acquired in the navigation device 20 is also input. The acceleration to be input includes longitudinal (front-rear direction in the aircraft coordinate system), lateral (left-right direction in the aircraft coordinate system), and vertical (up-down direction in the aircraft coordinate system) acceleration. The attitude angles to be input include the attitude angles in the pitch axis, the roll axis, and the yaw axis. Upon the input of the acceleration of the aircraft 1 and the attitude angle of the aircraft 1, the acceleration correction processing unit 41 calculates the attitude correction acceleration corresponding to the corrected acceleration of the aircraft 1 in the longitudinal direction and the lateral direction. The acceleration correction processing unit 41 outputs the calculated attitude correction acceleration to the second smoothing processing unit 43, the motion quantity estimation processing unit 51, and the feedback control unit 55.

The second Kalman filter 46 performs an estimation based on the relative position (X, Y) and outputs an estimated relative position (X, Y) after the estimation. Specifically, the relative position (X, Y) calculated by the guidance calculation unit 34 is input to the second Kalman filter 46. Upon the input of the relative position (X, Y), the second Kalman filter 46 calculates the estimated relative position (X, Y) by estimating the change of the relative position (X, Y) over time. The second Kalman filter 46 outputs the calculated estimated relative position (X, Y) to the second smoothing processing unit 43.

The second smoothing processing unit 43 performs a process for calculating a smoothed relative position, which is the average relative position, even when the target landing point 2 changes due to motion. The second smoothing processing unit 43 outputs the smoothed relative position (X, Y), in which the estimated relative position (X, Y) is smoothed, on the basis of the attitude correction acceleration and the estimated relative position (X, Y). Specifically, to the second smoothing processing unit 43, the attitude correction acceleration output from the acceleration correction processing unit 41 is input, and the estimated relative position (X, Y) calculated by the second Kalman filter 46 is also input. The second smoothing processing unit 43 calculates the smoothed relative position (X, Y) upon the input of the attitude correction acceleration and the estimated relative position (X, Y). The second smoothing processing unit 43 then outputs the calculated smoothed relative position (X, Y) to the second subtraction circuit unit 54 described below.

Figure 6:
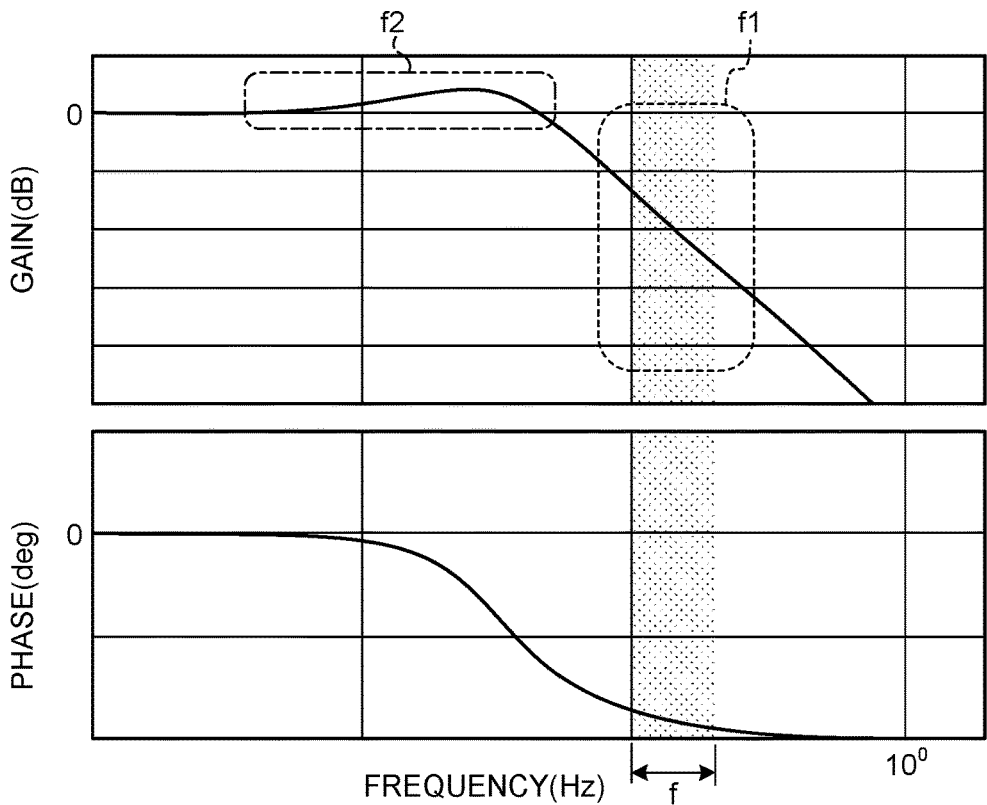
FIG. 6 is a Bode diagram from a relative position to a smoothed relative position of a second smoothing processing unit.

With reference to FIG. 6, the signal processing related to the relative position in the second smoothing processing unit 43 is described here. FIG. 6 is a Bode diagram from the relative position to the smoothed relative position of the second smoothing processing unit. In FIG. 6, its horizontal axis expresses frequency, and its vertical axis expresses a gain (dB) and a phase (deg). In FIG. 6, the frequency band where motion occurs is a motion frequency band f, and the frequency band that includes the motion frequency band f and is higher than or equal to the motion frequency band f is a frequency band f1 (first frequency band) and the frequency band that is lower than the motion frequency band f is a frequency band f2 (second frequency band).

The second smoothing processing unit 43 applies a gain to an input signal to amplify an output signal. The input signal is the estimated relative position (X, Y) and the output signal is the smoothed relative position (X, Y). As illustrated in FIG. 6, the frequency band f1 has a sufficiently low gain compared to the frequency band f2, which reduces the effect of the motion in the frequency band f1. The frequency band f2 has a large damping coefficient ($\zeta$>0.7) so that the low-frequency disturbance response is not oscillatory. Overshoot is suppressed as the value of the damping factor $\zeta$ is increased, and desirable results are obtained if $\zeta$>0.7.

The relative velocity estimation processing unit 47 outputs the estimated relative velocity on the basis of the relative position (X, Y) and the aircraft velocity of the aircraft 1. Specifically, to the relative velocity estimation processing unit 47, the relative position (X, Y) calculated by the guidance calculation unit 34 is input, and the aircraft velocity of the aircraft 1 in the longitudinal direction and the lateral direction acquired by the navigation device 20 is also input. The relative velocity estimation processing unit 47 estimates the relative velocity from the relative position (X, Y) and the aircraft velocity that are input, and outputs the estimated relative velocity to the second subtraction circuit unit 54 described below.

Figure 5:
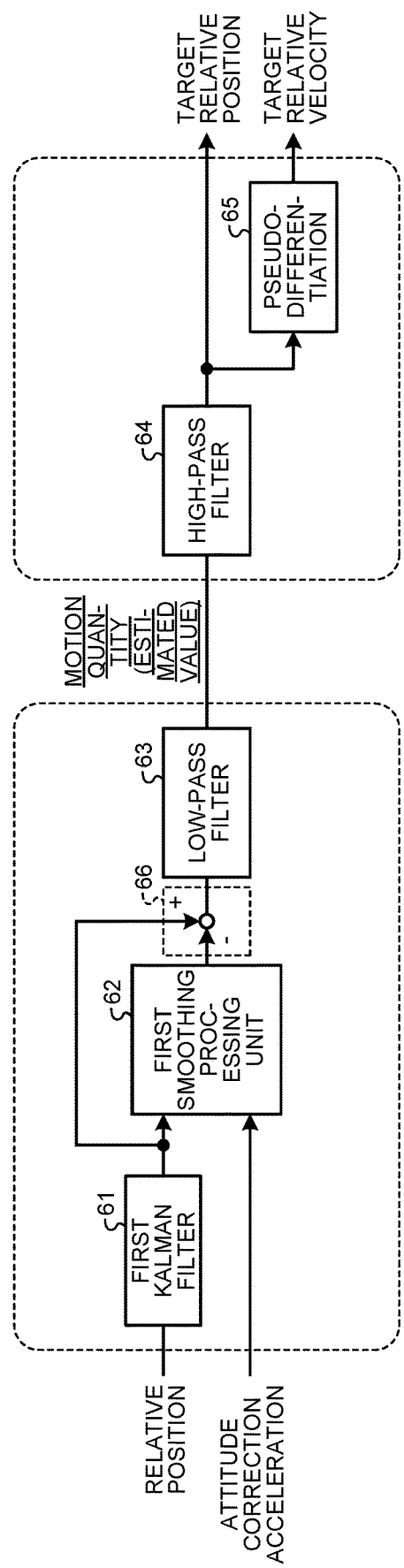
FIG. 5 is a block diagram illustrating one example of a motion quantity estimation process and a target information generation process.

The motion quantity estimation processing unit 51 performs a process for estimating the motion quantity of the target landing point 2 that changes due to motion. The motion quantity estimation processing unit 51 estimates the motion quantity on the basis of the attitude correction acceleration and the relative position (X, Y). FIG. 5 is a block diagram illustrating one example of a motion quantity estimation process and a target information generation process. As illustrated in FIG. 5, the motion quantity estimation processing unit 51 includes a first Kalman filter 61, a first smoothing processing unit 62, a low-pass filter 63, and a first subtraction circuit unit 66.

The first Kalman filter 61 performs an estimation based on the relative position (X, Y) and outputs the estimated relative position (X, Y) after the estimation in a manner similar to the second Kalman filter 46. Specifically, the relative position (X, Y) calculated by the guidance calculation unit 34 is input to the first Kalman filter 61. Upon the input of the relative position (X, Y), the first Kalman filter 61 calculates the estimated relative position (X, Y) by estimating the change of the relative position (X, Y) over time. The first Kalman filter 61 outputs the calculated estimated relative position (X, Y) to the first smoothing processing unit 62 and the first subtraction circuit unit 66. Here, the first Kalman filter 61 has a smaller time delay in the estimated relative position (X, Y) to be output than the second Kalman filter 46.

Similar to the second smoothing processing unit 43, the first smoothing processing unit 62 performs a process for calculating the smoothed relative position, which is the average relative position, even when the target landing point 2 changes due to motion. The first smoothing processing unit 62 outputs the smoothed relative position (X, Y), in which the estimated relative position (X, Y) is smoothed, on the basis of the attitude correction acceleration and the estimated relative position (X, Y). Specifically, to the first smoothing processing unit 62, the attitude correction acceleration output from the acceleration correction processing unit 41 is input, and the estimated relative position (X, Y) calculated by the first Kalman filter 61 is also input. Upon the input of the attitude correction acceleration and the estimated relative position (X, Y), the first smoothing processing unit 62 calculates the smoothed relative position (X, Y). The first smoothing processing unit 62 then outputs the calculated smoothed relative position (X, Y) to the first subtraction circuit unit 66.

The first subtraction circuit unit 66 outputs the motion quantity on the basis of the estimated relative position (X, Y) and the smoothed relative position (X, Y). Specifically, the first subtraction circuit unit 66 takes the difference between the estimated relative position (X, Y) and the smoothed relative position (X, Y) and calculates that difference as the motion quantity. The first subtraction circuit unit 66 then outputs the calculated motion quantity to the low-pass filter 63.

The low-pass filter 63 is a filter that attenuates frequencies of a predetermined cutoff frequency or more for the motion quantity input from the first subtraction circuit unit 66. The low-pass filter 63 removes the high-frequency component of the motion quantity and outputs the low-frequency component included in the motion quantity to the target information generation processing unit 52.

Figure 7:
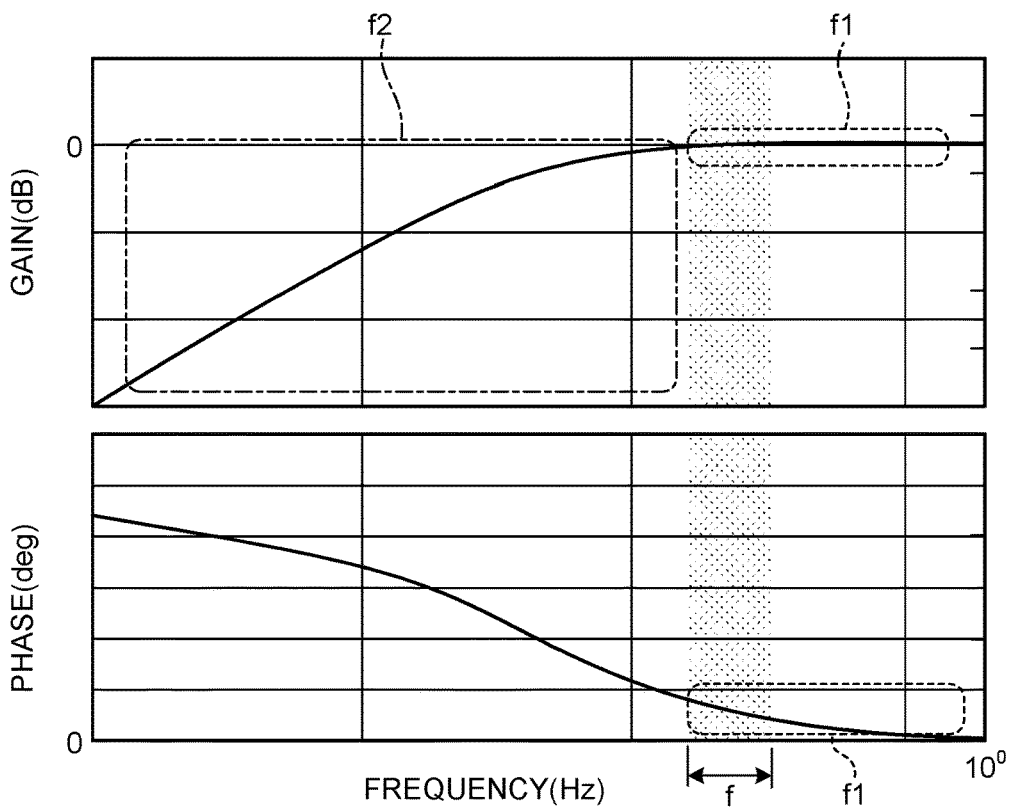
FIG. 7 is a Bode diagram from a relative position to a motion quantity (estimated value) of a motion quantity estimation processing unit.

Here, with reference to FIG. 7, the signal processing related to the relative position in the motion quantity estimation processing unit is described. FIG. 7 is a Bode diagram from the relative position to the motion quantity (estimated value) of the motion quantity estimation processing unit. In FIG. 7, its horizontal axis expresses frequency, and its vertical axis expresses a gain (dB) and a phase (deg). In FIG. 7, in a manner similar to FIG. 6, the frequency band where motion occurs is the motion frequency band f, and the frequency band that includes the motion frequency band f and is higher than or equal to the motion frequency band f is the frequency band f1 (first frequency band) and the frequency band that is lower than the motion frequency band f is the frequency band f2 (second frequency band).

The motion quantity estimation processing unit 51 applies a gain to the input signal to amplify the output signal. The input signal is the estimated relative position (X, Y) and the output signal is the motion quantity (estimated value). As illustrated in FIG. 7, the frequency band f1 is set to have a gain of 1 (in FIG. 7, the gain is 0 because it is illustrated as a logarithmic value), the motion quantity is extracted from the estimated relative position (X, Y) and additionally, the phase is advanced to enable early detection of the motion. As illustrated in FIG. 7, the frequency band f2 has a smaller gain than the frequency band f1, and the variation quantity other than the motion quantity is attenuated from the estimated relative position (X, Y).

Based on the motion quantity, the target information generation processing unit 52 outputs a target relative position between the aircraft 1 and the target landing point 2 to be achieved and target relative velocity between the aircraft 1 and the target landing point 2 to be achieved. As illustrated in FIG. 5, the target information generation processing unit 52 includes a high-pass filter 64 and a pseudo-differential filter 65.

The high-pass filter 64 is a filter that converts the motion quantity into the target relative position and outputs the converted target relative position. Here, it is assumed that the relative position of the aircraft 1 be Δy, the target position of the aircraft be y', and the current position of the aircraft 1 be y. When it is assumed that the current position y follows the target position y' with a delay, the following Equation (1) is obtained. In Equation (1), "s" is the operator, $F_L(s)$ is the low-pass filter, and $F_H(s)$ is the high-pass filter.

$$\Delta y = y' - y = (1 - F_L(s)) \cdot y' = F_H(s) \cdot y' \tag{1}$$

As expressed by Equation (1), the relative position Δy can be derived by multiplying the target position y' by the high-pass filter $F_H(s)$. Therefore, the target relative position is derived by multiplying the motion quantity by the high-pass filter 64. The high-pass filter 64 outputs the calculated target relative position to the second subtraction circuit unit 54 described below.

The pseudo-differential filter 65 is a filter that applies pseudo-differentiation to the target relative position to obtain the target relative velocity. Specifically, the pseudo-differential filter 65 calculates the target relative velocity by pseudo-differentiating the target relative position input from the high-pass filter 64, and outputs the calculated target relative velocity to the second subtraction circuit unit 54 described below.

The second subtraction circuit unit 54 calculates the position difference between the smoothed relative position (X, Y) input from the second smoothing processing unit 43 and the target relative position input from the target information generation processing unit 52. The second subtraction circuit unit 54 then outputs the calculated position difference to the feedback control unit 55. The second subtraction circuit unit 54 calculates the velocity difference between the estimated relative velocity input from the relative velocity estimation processing unit 47 and the target relative velocity input from the target information generation processing unit 52. The second subtraction circuit unit 54 then outputs the calculated velocity difference to the feedback control unit 55.

The feedback control unit 55 calculates the control quantity C' on the basis of the position difference and the velocity difference input from the second subtraction circuit unit 54 and the attitude correction acceleration input from the acceleration correction processing unit 41. The feedback control unit 55 then outputs the calculated control quantity C' to the flight control unit 36.

The flight control unit 36 executes the flight control on the basis of the control quantity C'. As an example of the flight control by the flight control unit 36, when the aircraft 1 is a helicopter, the flight control is performed by tilting the helicopter's main rotor in the longitudinal direction and the lateral direction; thus, the target point following hovering is performed.

The switch 53 switches whether to perform the target point following hovering. Specifically, the switch 53 switches whether to input the target relative position and the target relative velocity to the second subtraction circuit unit 54. The switch 53 allows the target relative position and the target relative velocity to be input to the second subtraction circuit unit 54, thereby enabling the target point following hovering to be performed. On the other hand, the switch 53 blocks the input of the target relative position and the target relative velocity to the second subtraction circuit unit 54, thereby disabling the execution of the target point following hovering and enabling the execution of spatial stable hovering. The spatial stable hovering is the flight control based on the smoothed relative position and is the position control related to the spatial stable hovering that keeps the aircraft 1 at the target relative position in inertial space with respect to the target landing point 2. When the input of the target relative position and the target relative velocity to the second subtraction circuit unit 54 is blocked by the switch 53, the smoothed relative position (X, Y) is input to the flight control unit 36, and therefore, the flight control unit 36 executes the flight control of the spatial stable hovering.

Here, the switching control by the switch 53 may use, for example, the motion quantity or altitude. In the case of using the motion quantity in the switching control, switching may be performed so that the flight control for the spatial stable hovering is performed if the motion quantity is more than or equal to a preset threshold and the flight control for the target point following hovering is performed if the motion quantity is less than the preset threshold. In the case of using the altitude in the switching control, switching may be performed so that the flight control for the spatial stable hovering is performed if the altitude is more than or equal to a preset threshold and the flight control for the target point following hovering is performed if the altitude is less than the preset threshold.

Aircraft Position Control Method

Figure 8:
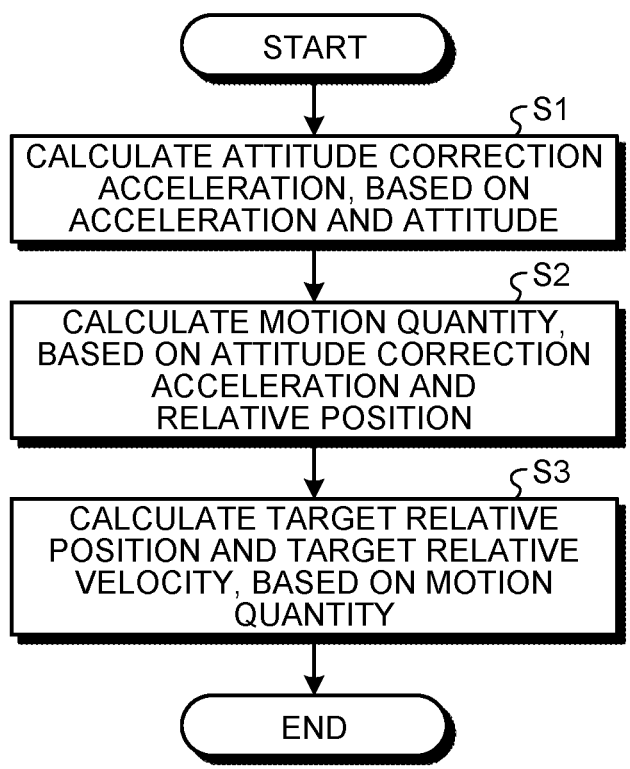
FIG. 8 is a flowchart for describing a procedure of calculating a target relative position and target relative velocity.

Next, a position control method using the position control system 100 for the aircraft 1 according to this embodiment is described with reference to FIG. 8. FIG. 8 is a flowchart for describing a procedure of calculating the target relative position and the target relative velocity. The position control method in FIG. 8 ends with the output of the target relative position and the target relative velocity from the target information generation processing unit 52.

In the position control method for the aircraft 1, the acceleration correction processing unit 41 first outputs the attitude correction acceleration on the basis of the acceleration of the aircraft 1 and the attitude of the aircraft 1 that are input (step S1). At step S1, because of the position control regarding the relative position (X, Y), the acceleration correction processing unit 41 outputs the attitude correction acceleration in the longitudinal direction and the lateral direction.

Subsequently, in the position control method for the aircraft 1, the motion quantity estimation processing unit 51 calculates and outputs the motion quantity on the basis of the attitude correction acceleration and the relative position (X, Y) (step S2). At step S2, the difference between the estimated relative position (X, Y) and the smoothed relative position (X, Y) is taken and this difference is calculated as the motion quantity.

After this, in the position control method for the aircraft 1, the target information generation processing unit 52 calculates and outputs the target relative position and the target relative velocity on the basis of the calculated motion quantity (step S3).

In the position control method for the aircraft 1, the target relative position and the target relative velocity that are output are input to the second subtraction circuit unit 54 after the execution of step S3. In the position control method, in the second subtraction circuit unit 54, the position difference between the smoothed relative position (X, Y) and the target relative position is calculated and the velocity difference between the estimated relative velocity and the target relative velocity is calculated. After this, in the position control method, the control amount C' is calculated in the feedback control unit 55 on the basis of the position difference, the velocity difference, and the attitude correction acceleration. After this, in the position control method, the calculated control quantity C' is input to the flight control unit 36, and the flight control unit 36 adjusts the aircraft velocity, attitude angle, rate of change of attitude angle, etc. of the aircraft 1 according to the control quantity C'. The flight control in the flight control unit 36 may be performed by PID control and multi-value control as described in, for example, Japanese Patent Application Laid-open No. 2021-062720.

Modification

Figure 9:
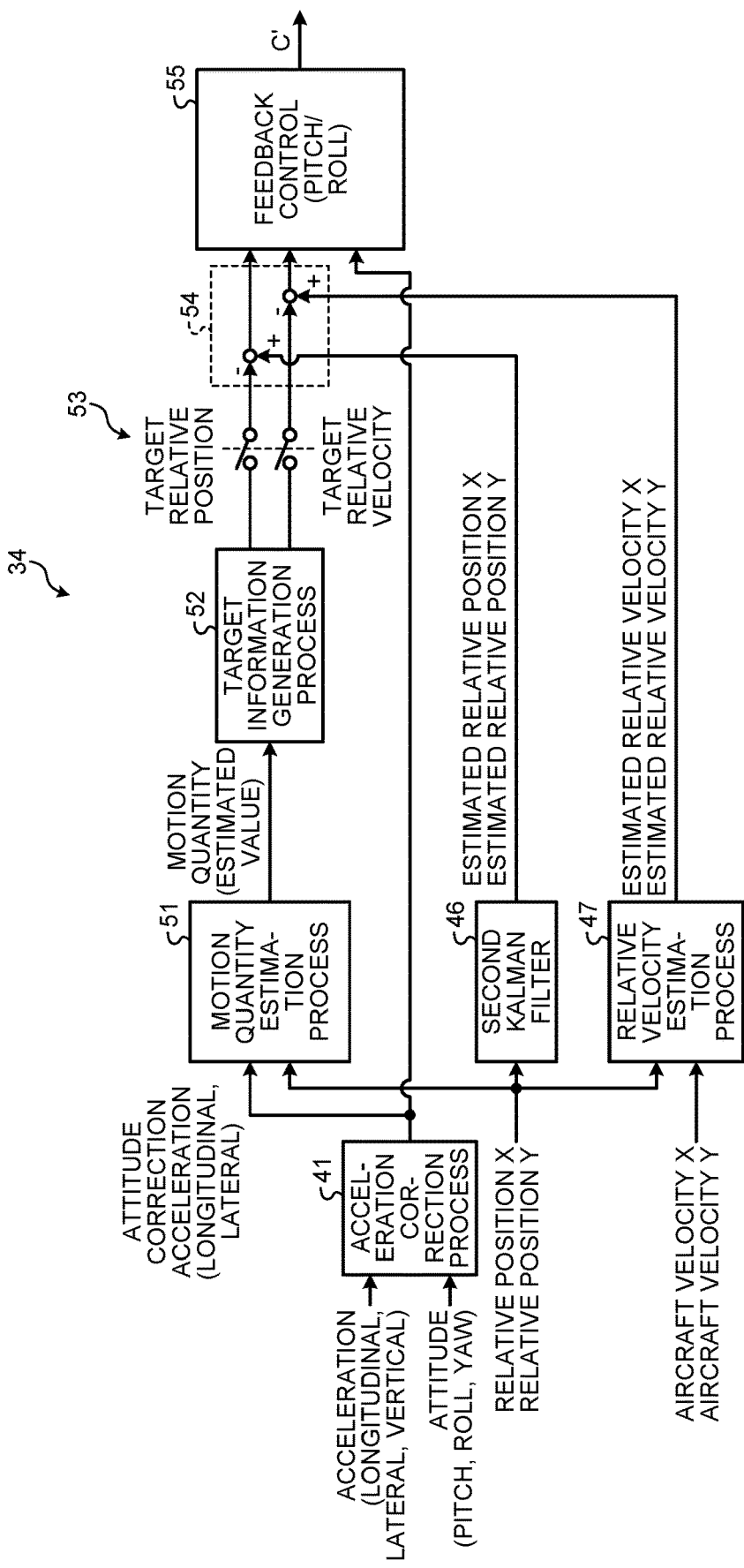
FIG. 9 is a block diagram illustrating another example of position control that makes the aircraft follow the target landing point that moves.

Next, another example of the position control system 100 and the position control method for the aircraft 1 is described with reference to FIG. 9. FIG. 9 is a block diagram illustrating another example of the position control related to the relative position of the aircraft based on the motion quantity. In the position control system 100 for the aircraft 1 in FIG. 4, the smoothed relative position (X, Y) is calculated in the second smoothing processing unit 43, and based on the position difference between the smoothed relative position (X, Y) and the target relative position, the velocity difference between the estimated relative velocity and the target relative velocity, and the attitude correction acceleration, the control amount C' is derived. In the position control system 100 for the aircraft 1 in FIG. 9, the second smoothing processing unit 43 is omitted, and based on the position difference between the estimated relative position and the target relative position estimated by the second Kalman filter 46, the velocity difference between the estimated relative velocity and the target relative velocity, and the attitude correction acceleration, the control quantity C' is derived.

In this embodiment, the attitude correction acceleration is used in estimating the motion quantity; however, the embodiment is not limited in particular and any attitude correction parameter for correcting the attitude of the aircraft 1 may be used.

As described above, the position control system 100 for the aircraft 1, the aircraft 1, and the position control method for the aircraft 1 according to the embodiment are understood as follows, for example.

The position control system 100 for the aircraft 1 according to a first aspect is the position control system 100 for the aircraft 1 to make the position of the aircraft 1 follow the movement of the target landing point 2 due to motion, and includes the motion quantity estimation processing unit 51 that estimates the motion quantity of the target landing point 2, based on the attitude correction acceleration obtained by correcting the acceleration of the aircraft 1 and the relative position (X, Y) between the aircraft 1 and the target landing point 2, and the target information generation unit 52 that outputs the target relative position between the aircraft 1 and the target landing point 2 to be achieved and the target relative velocity between the aircraft 1 and the target landing point 2 to be achieved, based on the estimated motion quantity.

According to this configuration, the target relative position and the target relative velocity can be calculated and output based on the motion quantity estimated using the attitude correction acceleration and the relative position (X, Y). Therefore, even if the target landing point 2 moves, performing the flight control of the aircraft 1 using the target relative position and the target relative velocity can make the aircraft 1 suitably follow the movement of the target landing point 2 that moves. Thus, since it is possible to make the aircraft 1 follow the target landing point 2, the aircraft 1 can land on the vessel at any desired timing, as long as the body of the aircraft 1 is stable. In landing, the body of the aircraft 1 can be brought into contact with the deck like landing on the ground regardless of the magnitude of the motion; thus, the degree of freedom in operation can be increased.

As a second aspect, the motion quantity estimation processing unit 51 includes the first Kalman filter 61 that outputs the estimated relative position (X, Y) estimated based on the relative position (X, Y), the first smoothing processing unit 62 that outputs the smoothed relative position (X, Y) obtained by smoothing the relative position (X, Y), based on the attitude correction acceleration and the estimated relative position (X, Y), and the first subtraction circuit unit 66 that calculates the difference between the smoothed relative position (X, Y) and the estimated relative position (X, Y) as the motion quantity.

With this configuration, the difference between the smoothed relative position (X, Y) and the estimated relative position (X, Y) can be calculated as the motion quantity and thus, the suitable motion quantity can be estimated.

As a third aspect, the target information generation unit includes the high-pass filter that converts the motion quantity into the target relative position and outputs the converted target relative position, and the pseudo-differential filter that pseudo-differentiates the converted target relative position and outputs the target relative velocity.

With this configuration, the target relative position can be quickly calculated from the motion quantity with the simple filter by using the high-pass filter. In addition, by using the pseudo-differential filter, the target relative velocity can be quickly calculated from the target relative position using the simple filter.

As a fourth aspect, the second Kalman filter 46 that outputs the estimated relative position estimated based on the relative position, the second smoothing processing unit 43 that outputs the smoothed relative position obtained by smoothing the relative position, based on the attitude correction acceleration and the estimated relative position, the relative velocity estimation processing unit 47 that estimates relative velocity between the aircraft 1 and the target landing point 2 and outputs the estimated relative velocity, and the second subtraction circuit unit 54 that outputs the position difference between the target relative position and the smoothed relative position and the velocity difference between the target relative velocity and the estimated relative velocity are further provided, and the flight of the aircraft 1 is controlled based on the position difference and the velocity difference.

With this configuration, the flight control of the aircraft 1 can be performed using the position difference between the target relative position and the smoothed relative position, and the velocity difference between the target relative velocity and the estimated relative velocity. This allows the aircraft 1 to accurately perform the target point following hovering with respect to the target landing point 2.

As a fifth aspect, the switching unit (switch 53) that switches whether to input the target relative position and the target relative velocity to the second subtraction circuit unit 54 is further provided.

With this configuration, the switching unit can switch whether to perform the flight control of the aircraft 1 related to the target point following hovering.

As a sixth aspect, the first smoothing processing unit 62 applies the gain to the relative position to output the smoothed relative position, when the frequency band that is higher than or equal to the motion frequency band f in which the motion occurs is the first frequency band f1 and the frequency band that is lower than the motion frequency band f is the second frequency band f2, the gain in the first frequency band f1 is lower than the gain in the second frequency band f2, and the damping coefficient $\zeta$ in the second frequency band f2 satisfies $\zeta>0.7$.

With this configuration, the first frequency band f1 has a sufficiently low gain compared to the second frequency band, which reduces the effect of the motion in the first frequency band f1. The second frequency band f2 has a larger damping coefficient ($\zeta>0.7$), so that the low-frequency disturbance response is not oscillatory.

As a seventh aspect, the motion quantity estimation processing unit 51 applies the gain to the relative position to output the motion quantity, when the frequency band that is higher than or equal to the motion frequency band f in which the motion occurs is the first frequency band f1 and the frequency band that is lower than the motion frequency band is the second frequency band, the gain in the first frequency band f1 is set to be 1 and the gain in the second frequency band f2 is lower than the gain in the first frequency band f1.

With this configuration, the first frequency band f1 has a gain of 1; therefore, when extracting the motion quantity from the estimated relative position (X, Y), the phase is advanced so that the motion can be detected earlier. The second frequency band f2 has a smaller gain than the first frequency band f1; therefore, the variation quantity other than the motion quantity can be attenuated from the estimated relative position (X, Y).

As an eighth aspect, the first Kalman filter 61 has a smaller time delay in the estimated relative position (X, Y) to be output than the second Kalman filter 46.

With this configuration, the time delay of the estimated relative position (X, Y) becomes smaller; therefore, the estimation of the motion quantity can be calculated more accurately.

The aircraft 1 according to a ninth aspect includes the acceleration correction processing unit 41 that acquires the attitude correction acceleration obtained by correcting the acceleration of the aircraft 1, the relative position acquisition unit (navigation device 20) that acquires the relative position between the aircraft 1 and the target landing point 2, and the position control system for the aircraft described above.

With this configuration, it is possible to provide the aircraft 1 with the flight controlled so that the aircraft 1 suitably follows the target landing point 2, even when the target landing point 2 moves.

The position control method for the aircraft 1 according to a tenth aspect is the position control method for the aircraft 1 for making the position of the aircraft 1 follow the movement of the target landing point 2 due to motion, and includes a step (step S2) of estimating the motion quantity of the target landing point 2, based on the attitude correction acceleration obtained by correcting the acceleration of the aircraft 1 and the relative position (X, Y) between the aircraft 1 and the target landing point 2, and a step (step S3) of outputting the target relative position between the aircraft 1 and the target landing point 2 to be achieved and the target relative velocity between the aircraft 1 and the target landing point 2 to be achieved, based on the estimated motion quantity.

According to this configuration, the target relative position and the target relative velocity can be calculated and output based on the motion quantity estimated using the attitude correction acceleration and the relative position (X, Y). Therefore, even if the target landing point 2 moves, performing the flight control of the aircraft 1 using the target relative position and the target relative velocity can make the aircraft 1 follow suitably the target landing point 2.

REFERENCE SIGNS LIST

1 Aircraft
2 Target landing point
5 Vessel
7 Marker
10 Camera
20 Navigation device
30 Control unit
32 Image processing unit
34 Guidance calculation unit
36 Flight control unit
41 Acceleration correction processing unit
43 Second smoothing processing unit
46 Second Kalman filter
47 Relative velocity estimation processing unit
51 Motion quantity estimation processing unit
52 Target information generation processing unit
53 Switch
54 Second subtraction circuit unit
61 First Kalman filter
62 First smoothing processing unit
63 Low-pass filter
64 High-pass filter
65 Pseudo-differential filter
66 First subtraction circuit unit
100 Position control system

The invention claimed is:

1. An aircraft position control system to make a position of an aircraft follow movement of a target landing point due to motion, the aircraft position control system comprising:
a processor, wherein
the processor is configured to
estimate a motion quantity of the target landing point, based on attitude correction acceleration obtained by correcting acceleration of the aircraft and based on a relative position between the aircraft and the target landing point;
output a target relative position between the aircraft and the target landing point to be achieved and target relative velocity between the aircraft and the target landing point to be achieved, based on the estimated motion quantity; and
control flight of the aircraft based on the output target relative position and the target relative velocity.

2. The aircraft position control system according to claim 1, wherein the processor is configured to
output an estimated relative position estimated based on the relative position using a first Kalman filter;
output a smoothed relative position obtained by smoothing the relative position, based on the attitude correction acceleration and the estimated relative position; and
calculate a difference between the smoothed relative position and the estimated relative position as the motion quantity.

3. The aircraft position control system according to claim 1, wherein the processor is configured to
convert the motion quantity into the target relative position to output the converted target relative position; and
pseudo-differentiate the converted target relative position to output the target relative velocity.

4. The aircraft position control system according to claim 2, wherein the processor is configured to
output an estimated relative position estimated based on the relative position using a second Kalman filter;
output a smoothed relative position obtained by smoothing the relative position, based on the attitude correction acceleration and the estimated relative position;
estimate relative velocity between the aircraft and the target landing point to output the estimated relative velocity; and
output a position difference between the target relative position and the smoothed relative position and a velocity difference between the target relative velocity and the estimated relative velocity, wherein
flight of the aircraft is controlled based on the position difference and the velocity difference.

5. The aircraft position control system according to claim 4, wherein the processor is configured to switch whether to input the target relative position and the target relative velocity.

6. The aircraft position control system according to claim 4, wherein
the processor is configured to apply a gain to the relative position to output the smoothed relative position,
when a frequency band that is higher than or equal to a motion frequency band in which the motion occurs is a first frequency band and a frequency band that is lower than the motion frequency band is a second frequency band, the gain in the first frequency band is lower than the gain in the second frequency band, and
a damping coefficient $\zeta$ in the second frequency band satisfies $\zeta > 0.7$.

7. The aircraft position control system according to claim 1, wherein
the processor is configured to apply a gain to the relative position to output the motion quantity, and
when a frequency band that is higher than or equal to a motion frequency band in which the motion occurs is a first frequency band and a frequency band that is lower than the motion frequency band is a second frequency band, the gain in the first frequency band is set to be 1 and the gain in the second frequency band is lower than the gain in the first frequency band.

8. The aircraft position control system according to claim 4, wherein the first Kalman filter has a smaller time delay in the estimated relative position to be output than the second Kalman filter.

9. An aircraft comprising:
the aircraft position control system according to claim 1, the processor is configured to
acquire attitude correction acceleration obtained by correcting acceleration of the aircraft; and
acquire a relative position between the aircraft and a target landing point.

10. The aircraft position control system according to claim 3, wherein the processor is configured to
output an estimated relative position estimated based on the relative position using a second Kalman filter;
output a smoothed relative position obtained by smoothing the relative position, based on the attitude correction acceleration and the estimated relative position;
estimate relative velocity between the aircraft and the target landing point to output the estimated relative velocity; and
output a position difference between the target relative position and the smoothed relative position and a velocity difference between the target relative velocity and the estimated relative velocity, wherein
flight of the aircraft is controlled based on the position difference and the velocity difference.

11. The aircraft position control system according to claim 10, wherein the processor is configured to switch whether to input the target relative position and the target relative velocity.

12. The aircraft position control system according to claim 10, wherein
the processor is configured to
apply a gain to the relative position to output the smoothed relative position,
when a frequency band that is higher than or equal to a motion frequency band in which the motion occurs is a first frequency band and a frequency band that is lower than the motion frequency band is a second frequency band, the gain in the first frequency band is lower than the gain in the second frequency band, and
a damping coefficient $\zeta$ in the second frequency band satisfies $\zeta > 0.7$.

13. The aircraft position control system according to claim 10, wherein the first Kalman filter has a smaller time delay in the estimated relative position to be output than the second Kalman filter.

14. An aircraft position control method for making a position of an aircraft follow movement of a target landing point due to motion, the aircraft position control method comprising:
estimating a motion quantity of the target landing point, based on attitude correction acceleration obtained by correcting acceleration of the aircraft and a relative position between the aircraft and the target landing point; and
outputting a target relative position between the aircraft and the target landing point to be achieved and target relative velocity between the aircraft and the target landing point to be achieved, based on the estimated motion quantity; and
controlling flight of the aircraft based on the output target relative position and the target relative velocity.

* * * * *